US012472986B2

(12) United States Patent
Dobberphul et al.

(10) Patent No.: US 12,472,986 B2
(45) Date of Patent: Nov. 18, 2025

(54) METHOD FOR THE AUTOMATED DRIVING OF A MOTOR VEHICLE, AND AUTOMATED MOTOR VEHICLE

(71) Applicant: VOLKSWAGEN AKTIENGESELLSCHAFT, Wolfsburg (DE)

(72) Inventors: Timo Dobberphul, Braunschweig (DE); Sarah Alexa Thissen, Braunschweig (DE); Jens Lüddecke, Wendeburg (DE)

(73) Assignee: VOLKSWAGEN AKTIENGESELLSCHAFT GERMANY (DE)

( * ) Notice: Subject to any disclaimer, the term of this patent is extended or adjusted under 35 U.S.C. 154(b) by 71 days.

(21) Appl. No.: 18/687,472

(22) PCT Filed: Jul. 19, 2022

(86) PCT No.: PCT/EP2022/070272
§ 371 (c)(1),
(2) Date: Feb. 28, 2024

(87) PCT Pub. No.: WO2023/030745
PCT Pub. Date: Mar. 9, 2023

(65) Prior Publication Data

US 2024/0351612 A1 Oct. 24, 2024

(30) Foreign Application Priority Data

Sep. 2, 2021 (DE) ..................... 10 2021 209 674.3

(51) Int. Cl.
*B60W 60/00* (2020.01)
*B60W 40/10* (2012.01)
*B60W 50/029* (2012.01)

(52) U.S. Cl.
CPC ........ *B60W 60/0018* (2020.02); *B60W 40/10* (2013.01); *B60W 50/029* (2013.01); *B60W 2520/06* (2013.01)

(58) Field of Classification Search
CPC ..... B60W 2050/0006; B60W 2520/06; B60W 40/10; B60W 50/023; B60W 50/029; B60W 60/001; B60W 60/0018; B62D 15/025
See application file for complete search history.

(56) References Cited

U.S. PATENT DOCUMENTS 9,606,537 B2 3/2017 Hogenmueller et al.
9,663,104 B2 5/2017 Hauler et al.
(Continued)

FOREIGN PATENT DOCUMENTS

DE 102013213171 A1 1/2015
DE 102015003124 A1 9/2016
(Continued)

OTHER PUBLICATIONS

Search Report; International Patent Application No. PCT/EP2022/070272; Nov. 10, 2022.

*Primary Examiner* — Wade Miles
*Assistant Examiner* — Zachary Joseph Wallace
(74) *Attorney, Agent, or Firm* — BARNES & THORNBURG LLP

(57) ABSTRACT

A method for the automated driving of a transportation vehicle, having at least one control device for calculating a trajectory, wherein control commands for actuators for setting longitudinal and lateral guidance of the transportation vehicle are calculated for the trajectory and are implemented by the actuators, wherein the control commands are updated at fixed points in time, wherein at each point in time a current emergency trajectory for bringing the transportation vehicle to a standstill is calculated, wherein a set of control
(Continued)

commands for actuators for setting at least the lateral guidance are calculated for the emergency trajectory and, in the absence of the control commands for the trajectory, are automatically implemented by the actuators for the emergency trajectory. Also disclosed is an automated transportation vehicle.

15 Claims, 2 Drawing Sheets

(56) References Cited

U.S. PATENT DOCUMENTS

| | | | | |
|---|---|---|---|---|
| 11,603,115 | B1 | 3/2023 | Heckmann et al. | |
| 11,608,080 | B2 | 3/2023 | Oltmann et al. | |
| 11,891,092 | B2 | 2/2024 | Kuemmel et al. | |
| 2019/0168805 | A1 | 6/2019 | Siskoy | |
| 2019/0384303 | A1 | 12/2019 | Muller et al. | |
| 2021/0197864 | A1 | 7/2021 | Oltmann et al. | |
| 2021/0206388 | A1* | 7/2021 | Smith | B60W 60/0015 |
| 2021/0300392 | A1* | 9/2021 | Shionome | G07C 5/0816 |
| 2022/0402514 | A1* | 12/2022 | Kousselson | B60W 60/00186 |

FOREIGN PATENT DOCUMENTS

| | | | |
|---|---|---|---|
| DE | 102017011808 | A1 | 6/2019 |
| DE | 102018004303 | B3 | 11/2019 |
| DE | 102019102830 | A1 | 8/2020 |
| DE | 102020000593 | A1 | 8/2021 |

* cited by examiner

METHOD FOR THE AUTOMATED DRIVING OF A MOTOR VEHICLE, AND AUTOMATED MOTOR VEHICLE

PRIORITY CLAIM

This patent application is a U.S. National Phase of International Patent Application No. PCT/EP2022/070272, filed 19 Jul. 2022, which claims priority to German Patent Application No. 10 2021 209 674.3, filed 2 Sep. 2021, the disclosures of which are incorporated herein by reference in their entireties.

SUMMARY

Illustrative embodiments relate to a method for the automated driving of a transportation vehicle and an automated driving transportation vehicle.

BRIEF DESCRIPTION OF THE DRAWINGS

Disclosed embodiments are explained in more detail below with reference to the figures, in which.

DETAILED DESCRIPTION

Figure 1:
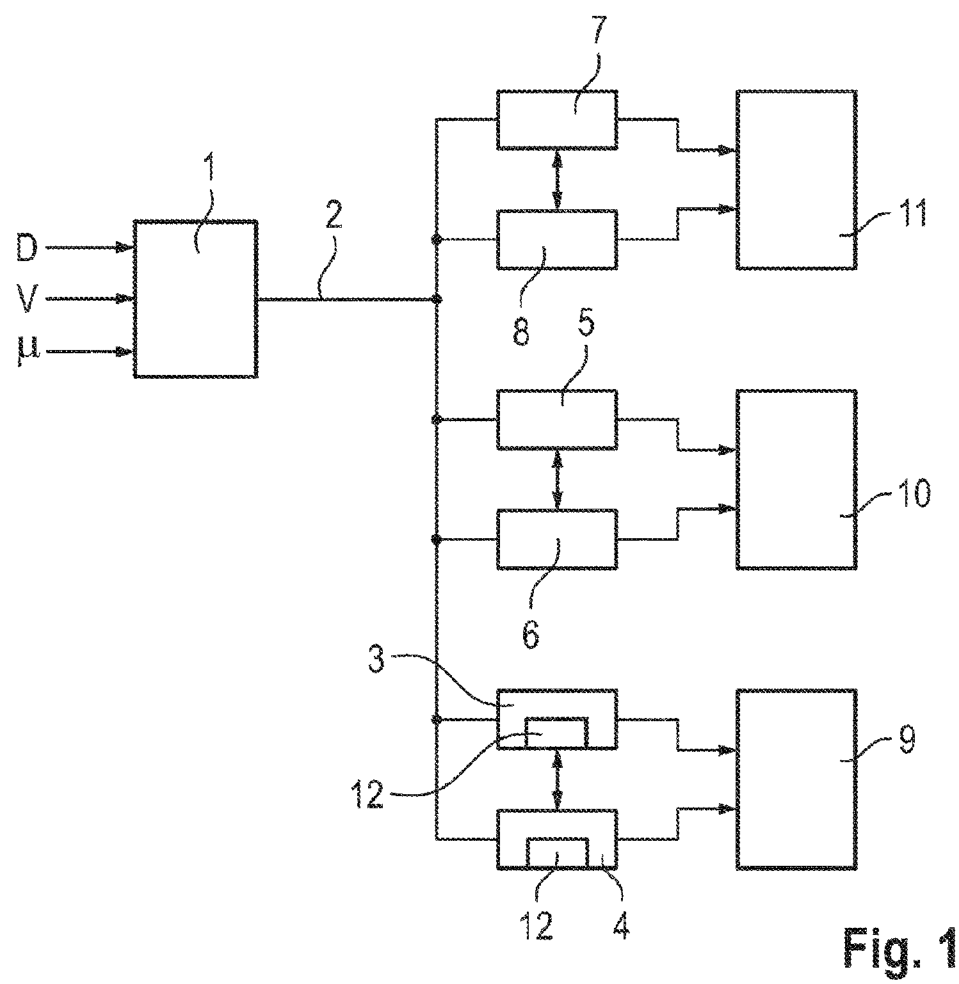
FIG. 1 a schematic circuit arrangement of a first exemplary embodiment.

In automated driving at SAE Level 4, the driver is not present in the transportation vehicle as a fallback level, i.e., the overall system must be designed to be fault-tolerant in such a way that the transportation vehicle always moves without danger or can be transferred to a safe state (for example, stopping on the hard shoulder). Depending on the maximum speed, this results in a minimum time/distance after the occurrence of an error, during which the entire system must continue to function (fail operational).

A possible approach is redundant data transmission with the exclusion of common causes, i.e., two parallel transmitters, communication buses and receivers whose transmission cannot be interrupted by the same cause of failure. Common causes can be assumed to be EMC, temperature, water, mechanical damage or systematic hardware failures, which means that the parallel buses have to be implemented spatially separated, at different heights, by different media according to different transmission principles and different technologies. This approach is very costly and complex.

An automated transportation vehicle is known from US 2019/0168805 A1. It is envisaged that a central control unit transmits current steering control commands and future steering control commands to a steering control unit, wherein one or more future steering control commands is executed in the event of an error.

The disclosed embodiments provide a method for the automated driving of a transportation vehicle to operate the transportation vehicle safely with low complexity. Disclosed embodiments also provide a suitable automated transportation vehicle.

The method for the automated driving of a transportation vehicle is carried out by at least one control unit for calculating a trajectory, wherein control commands for actuators for adjusting longitudinal and lateral guidance of the transportation vehicle are calculated for the trajectory and are implemented by the actuators. The actuators are, for example, a drive actuator, a brake actuator and a steering actuator. The control commands are updated at specified points in time. For example, a steering control unit receives an updated steering command every 10 ms. In addition, a current emergency trajectory is calculated at any point in time to bring the transportation vehicle to a vehicle standstill, wherein for the emergency trajectory a set of control commands for actuators for adjusting at least the lateral guidance is calculated, which are automatically implemented for the emergency trajectory by the actuators in the event of failure of the control commands for the trajectory. This means that in the event of a failure of data communication, the transportation vehicle can always be safely brought to a standstill. The set of control commands for the emergency trajectory is always transmitted in parallel with the control commands for the trajectory, so that a current emergency trajectory can always be followed.

It may be provided that the set of control commands for the emergency trajectory contains only steering control commands. In this case, fixed predefined control commands for the braking force are processed in a control unit in an emergency, wherein a constant deceleration is set, for example. This constant deceleration does not have to be the maximum possible deceleration. Rather, a fixed comfort deceleration can be selected (for example, 3.9 $m/s^2$). This is then also used as a basis for calculating the emergency trajectory. Assuming a maximum vehicle speed of 70 km/h, the transportation vehicle comes to a standstill after 50 m or 5 s. The benefit is that the number of control commands to be transmitted is reduced, which simplifies data transfer. However, it is possible to calculate control commands for the brake actuators or even the drive actuators and transfer them in the set of control commands.

In at least one disclosed embodiment, the set of control commands is a fixed predetermined number of control commands and/or the control commands in the set of control commands are assigned a fixed point in time.

This will be briefly explained using a numerical example. As explained above, a transportation vehicle comes to a stop from 70 km/h and with a deceleration of 3.9 $m/s^2$ after 50 m or 5 s. For adjusting a steering control command every 0.5 s, 10 control commands are required for the entire emergency trajectory. However, if the transportation vehicle is travelling at a low speed, it will come to a standstill earlier. Here there is now the possibility to plan the emergency trajectory in a more fine-grained way and to divide the 10 control commands into 4 s, for example. However, it is also possible to maintain the times (for example, 0.5 s). If the number is to remain constant, zeros are transmitted as the last control commands (since the transportation vehicle is already stationary). However, the times can also be kept constant (for example, every 0.5 s) and only the necessary control commands can be transmitted (for example, 8 instead of 10).

In another disclosed embodiment, the control commands for the trajectory and the set of control commands for the emergency trajectory are transmitted via separate bus systems. In addition to reliability, the bus load can also be better distributed.

In another disclosed embodiment, the control commands for the trajectory are calculated in a first control unit and the set of control commands for the emergency trajectory in a second control unit. As a result, the computing load can be better distributed. The first and second control units can also monitor each other.

In another disclosed embodiment, on the other hand, the control commands for the trajectory and the set of control commands for the emergency trajectory are calculated in a common control unit, which saves one control unit.

In another disclosed embodiment, two control units are assigned to each of the actuators, wherein the two control units monitor each other, wherein only one control unit transmits control commands to the assigned actuator at a time. The two control units can work as master and slave.

In at least one disclosed embodiment, it may be provided that one control unit transmits only the control commands for the trajectory to the actuator and the other control unit only the control commands for the emergency trajectory.

The automated transportation vehicle comprises at least one control unit for calculating a trajectory, wherein the at least one control unit or another control unit is designed to calculate control commands for actuators for adjusting longitudinal and lateral guidance of the transportation vehicle for the trajectory, which are implemented by the actuators. The control commands are updated at specified points in time. Furthermore, at least one control unit is designed to calculate a current emergency trajectory at any specified point in time to bring the transportation vehicle to a vehicle standstill, wherein a set of control commands for actuators for setting at least the lateral guidance is calculated for the emergency trajectory, which are automatically implemented by the actuators in the event of failure of the control commands for the trajectory.

Regarding the further design, reference is made in full to the procedural statements.

FIG. 1 shows a circuit arrangement of an automated transportation vehicle. The circuit arrangement contains a first central control unit 1. The central control unit 1 is connected to various control units via a bus system 2, which contain various actuators for setting the longitudinal and lateral dynamics of the transportation vehicle. The control units include two steering control units 3, 4, two brake control units 5, 6 and two drive control units 7, 8. The two steering control units 3, 4 control a steering actuator 9. The two brake control units 5, 6 control a brake actuator 10 and the two drive control units 7, 8 control a drive actuator 11. It should be noted that a drive control unit 7, 8 can also be omitted. It is further shown that each two control units for an actuator are connected to each other to monitor each other. Furthermore, at least one of the steering control units 3, 4 has a memory 12 for a set of control commands for an emergency trajectory.

The central control unit 1 receives data D from an environment sensor that is not illustrated, a vehicle speed V and, if appropriate, a coefficient of friction u of a road surface. In addition, data from a traffic infrastructure or from other road users can be fed to the control unit 1. From all this data, the control unit 1 calculates a trajectory that the transportation vehicle should follow. The control unit 1 then determines control commands for actuators 9-11 so that they adjust the longitudinal and lateral dynamics in such a way that the calculated trajectory is followed. These control commands are transmitted to the control units of the actuators via the bus system 2. The control commands are transmitted at fixed times (for example, every 10 ms). At the same time, the control unit 1 calculates an emergency trajectory to safely come to a vehicle standstill from the current position. For this emergency trajectory, a set of control commands is calculated for at least the steering actuator 9. This set of control commands is also transmitted via the bus system 2. The control units receive the control commands and at least one control unit controls actuators the assigned to it with the transmitted control command. At least one steering control unit 3, 4 also stores the control commands of the set for the emergency trajectory. In normal operation, a new set of control commands for an emergency trajectory is then introduced at the next set point in time and the old data are overwritten. If, due to any error, no steering control unit 3, 4 receives current control commands for the trajectory, then a steering control unit 3, 4 processes the control commands of the emergency trajectory that were last received. It may be provided that only one of the two steering control units 3, 4 can transmit the control commands of the emergency trajectory to the steering actuator system 9. However, versions are also possible wherein both steering control units 3, 4 can store the set of control commands and process them in an emergency.

At least one brake control unit contains permanently stored brake control commands for the emergency trajectory, for example, for braking the transportation vehicle with a constant deceleration. The brake control units 5, 6 and the steering control units 3, 4 exchange information, wherein the corresponding data connection is not shown for reasons of clarity. Here the control units exchange information as to whether they have received current control commands for the trajectory. If, for example, both brake control units or both steering control units have not received any control commands, the emergency trajectory must be followed by one steering control unit 3, 4 transmitting the last set of control commands for the emergency trajectory to the steering actuator 9 and at least one brake control unit transmitting the constant deceleration to the brake actuator 10. Furthermore, at least one drive control unit 7, 8 may be informed about following the emergency trajectory, so that no additional drive torque is generated. Optionally, the two steering control units 3, 4 and the two brake control units 5, 6 work as master and slave. It should be noted once again that the time interval between two control commands of the emergency trajectory can be greater than the time interval between two control commands for the trajectory.

Figure 2:
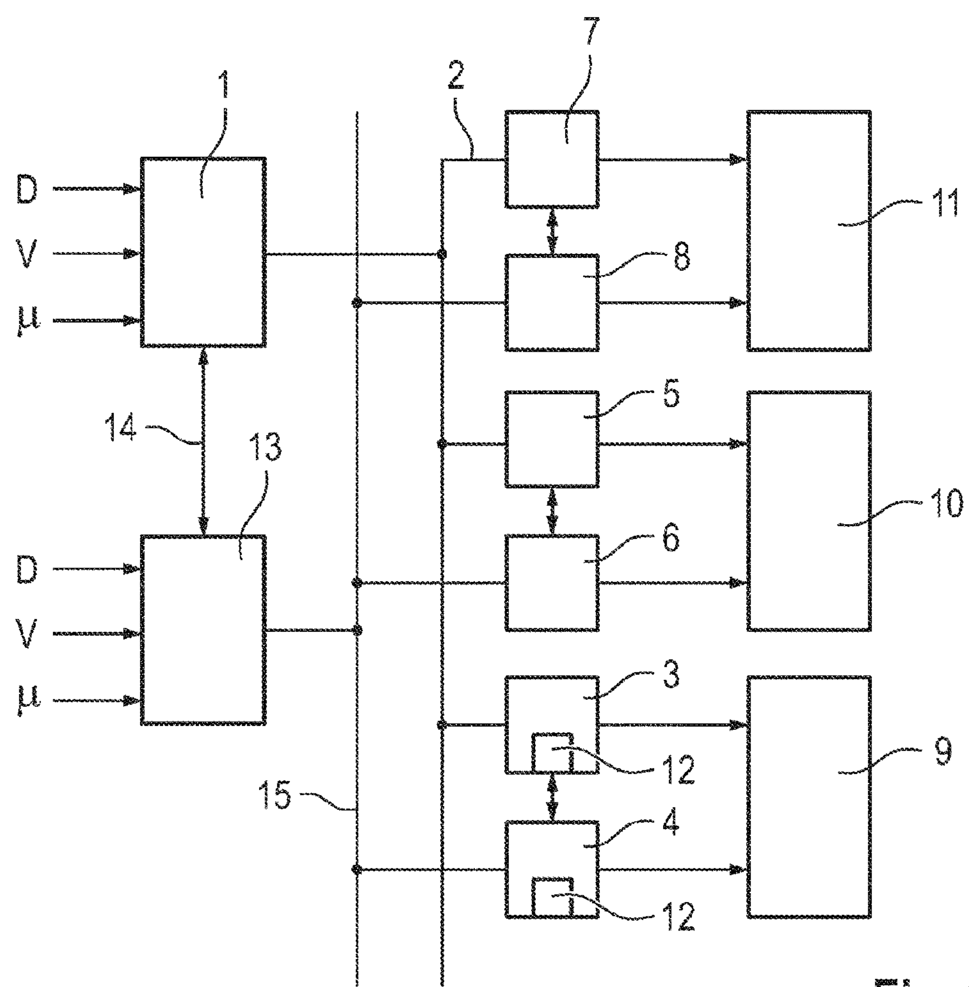
FIG. 2 a schematic circuit arrangement of a second exemplary embodiment.

FIG. 2 shows an alternative circuit arrangement. A first difference is that in addition to the central control unit 1, there is a second control unit 13 that calculates the emergency trajectory and the set of control commands. The central, first control unit 1 and the second control unit 13 can work as master and slave. For this purpose, the two control units 1, 13 are connected to each other via a data connection 14. Furthermore, the first control unit 1 is connected to a first bus system 2 and the second control unit 13 to a second bus system 15. It is further shown that only one control unit is connected to a bus system at a time. However, this is not mandatory. This means that each control unit can also be connected to both bus systems 2, 15. It may also be provided that the central control unit 1 and the second control unit 13 exchange the calculated control commands thereof, wherein both control units 1, 13 then transmit both the control commands for the trajectory and the set of control commands for the emergency trajectory via the bus systems 2, 15. The number of control commands in a set for the emergency trajectory may be between 5 to 50 and optionally may be between 10 to 20.

REFERENCE SIGN LIST

1 Control unit
2 Bus system
3, 4 Steering control unit
5, 6 Brake control unit
7, 8 Drive control unit
9 Steering actuators
10 Brake actuators

11 Drive actuators
12 Memory
13 Control unit
14 Data connection
15 Bus system
D Data
V Vehicle speed
μ Coefficient of friction

The invention claimed is:

1. A method for the automated driving of a transportation vehicle, the method comprising:

at least one control unit calculating a trajectory for the automated transportation vehicle, wherein control commands for actuators for adjusting longitudinal and lateral guidance of the automated transportation vehicle are calculated for the calculated trajectory;

implementing the calculated control commands for the trajectory by actuators of the automated transportation vehicle;

updating the actuator control commands periodically at specified points in time by calculating a current emergency trajectory to bring the automated transportation vehicle to a standstill at each of the specified points in time, and calculating a set of control commands for at least one of the actuators of the transportation vehicle to adjust at least the lateral guidance for the current calculated emergency trajectory for the transportation vehicle; and updating the actuator control commands of the current trajectory in response to detection of communication failure to communicate the control commands for the current trajectory between a plurality of components of the automated transportation vehicle, wherein the updated actuator control commands calculated and updated in response to detection of current trajectory control command failure between the plurality of components of the automated transportation vehicle are automatically implemented by the at least at least one actuator of the transportation vehicle actuators to adjust at least the lateral guidance for the current calculated emergency trajectory in response to the failure of the control commands for the current trajectory.

2. The method of claim 1, wherein the set of control commands for the current calculated emergency trajectory is a fixed predetermined number of control commands and/or wherein, a fixed point in time is assigned to the control commands in the set of control commands.

3. The method of claim 1, further comprising transmitting the trajectory control commands and the set of control commands for the current calculated emergency trajectory via separate bus systems of the transportation vehicle.

4. The method of claim 1, wherein the control commands for the trajectory are calculated in a first control unit and the set of control commands for the current calculated emergency trajectory are calculated in a second control unit.

5. The method of claim 1, wherein the control commands for the trajectory and the set of control commands for the current calculated emergency trajectory are both calculated in a common control unit.

6. The method of claim 1, wherein two control units are assigned to each of the actuators, and the method further comprises the two control units monitoring each other, wherein only one control unit transmits control commands to the assigned actuator at a time.

7. The method of claim 6, wherein one control unit transmits only the control commands for the trajectory to the assigned actuator and the other control unit only the control commands for the current calculated emergency trajectory.

8. An automated transportation vehicle comprising:

at least one control unit configured to calculate a trajectory for the automated transportation vehicle, wherein the at least one control unit or another control unit is configured to calculate control commands for actuators of the automated transportation vehicle to adjust longitudinal and lateral guidance of the transportation vehicle for the calculated trajectory; and actuators for implementing the calculated control commands for the trajectory, wherein the control commands are updated at specified points in time, wherein the at least one control unit is configured to update the actuator control commands periodically at specified points in time by calculating a current emergency trajectory to bring the automated transportation vehicle to a standstill at each of the specified points in time, and calculating a set of control commands for at least one of the actuators of the transportation vehicle to adjust at least the lateral guidance for the current calculated emergency trajectory for the transportation vehicle, wherein the at least one control unit is further configured to update the actuator control commands of the current trajectory in response to detection of failure to communicate the control commands for the current trajectory for the current trajectory between a plurality of components of the automated transportation vehicle, and wherein the updated actuator control commands calculated and updated in response to the detection of the failure to communicate the control commands for the current trajectory between the plurality of components of the automated transportation vehicle are automatically implemented by at least one of the at least one actuator of the transportation vehicle actuators to adjust at least the lateral guidance for the current calculated emergency trajectory in response to the failure of the control commands for the current trajectory.

9. The automated transportation vehicle of claim 8, wherein the set of control commands for the current calculated emergency trajectory is a fixed predetermined number of control commands and/or wherein a fixed point in time is assigned to the control commands in the set of control commands.

10. The automated transportation vehicle of claim 8, wherein the at least one control unit is configured to calculate both the control commands for the trajectory and the set of control commands for the current calculated emergency trajectory.

11. The automated transportation vehicle of claim 8, further comprising a plurality of bus systems, wherein the trajectory control commands and the set of control commands for the current calculated emergency trajectory are transmitted to the actuators via separate bus systems.

12. The automated transportation vehicle of claim 8, wherein the at least one control unit is one of a plurality of control units wherein control commands for the trajectory are calculated in a first control unit of the plurality of control units and the set of control commands for the current calculated emergency trajectory are calculated in a second control unit of the plurality of control units.

13. The automated transportation vehicle of claim 8, wherein the control commands for the trajectory and the set of control commands for the current calculated emergency trajectory are both calculated in a common control unit that is the at least one control unit.

14. The automated transportation vehicle of claim 8, wherein the at least one control unit is one of a plurality of control units wherein two control units of the plurality of control units are assigned to each of the actuators, and the automated transportation vehicle further comprises the two control units monitoring each other, wherein only one control unit transmits control commands to the assigned actuator at a time.

15. The automated transportation vehicle of claim 14, wherein one control unit of the plurality of control units transmits only the control commands for the trajectory to the assigned actuator and the other control unit of the plurality of control units transmits only the control commands for the current calculated emergency trajectory.

* * * * *